United States Patent
Ohtomo et al.

(10) Patent No.: US 8,670,130 B2
(45) Date of Patent: Mar. 11, 2014

(54) LASER SCANNER

(75) Inventors: Fumio Ohtomo, Tokyo-to (JP); Kaoru Kumagai, Tokyo-to (JP); Minoru Chiba, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 279 days.

(21) Appl. No.: 13/084,859

(22) Filed: Apr. 12, 2011

(65) Prior Publication Data

US 2011/0261368 A1 Oct. 27, 2011

(30) Foreign Application Priority Data

Apr. 22, 2010 (JP) .................................. 2010-98670

(51) Int. Cl.
*G01B 11/24* (2006.01)

(52) U.S. Cl.
USPC ........ 356/607; 356/608; 356/141.3; 356/613; 250/559.06; 33/290; 33/275 R

(58) Field of Classification Search
USPC ................ 356/607, 608; 33/284; 250/559.23, 250/559.27, 559.19
See application file for complete search history.

(56) References Cited

U.S. PATENT DOCUMENTS

| | | | |
|---|---|---|---|
| 5,258,822 A | 11/1993 | Nakamura et al. | |
| 5,946,087 A | 8/1999 | Kasori et al. | |
| 7,127,822 B2 | 10/2006 | Kumagai et al. | |
| 2002/0108761 A1* | 8/2002 | Ohtomo et al. | 172/4.5 |
| 2005/0172503 A1* | 8/2005 | Kumagai et al. | 33/290 |
| 2008/0075325 A1 | 3/2008 | Otani et al. | |
| 2008/0186470 A1 | 8/2008 | Hipp | |
| 2009/0171610 A1 | 7/2009 | Haijima et al. | |
| 2009/0241358 A1* | 10/2009 | Ohtomo et al. | 33/275 R |
| 2009/0241359 A1* | 10/2009 | Hayashi et al. | 33/284 |

FOREIGN PATENT DOCUMENTS

| | | |
|---|---|---|
| EP | 0854351 A2 | 7/1998 |
| EP | 1411371 A1 | 4/2004 |
| JP | 4-315085 A | 11/1992 |
| JP | 2001-318148 A | 11/2001 |
| JP | 2004-93504 A | 3/2004 |
| JP | 2008-76303 A | 4/2008 |
| JP | 2009-156773 A | 7/2009 |
| WO | 2008/008970 A2 | 1/2008 |

OTHER PUBLICATIONS

Extended European Search Report and Written Opinion dated Jul. 29, 2011 in corresponding foreign patent application No. EP 11162947.3.

* cited by examiner

*Primary Examiner* — Tarifur Chowdhury
*Assistant Examiner* — Isiaka Akanbi
(74) *Attorney, Agent, or Firm* — Nields, Lemack & Frame, LLC

(57) ABSTRACT

The invention provides a laser scanner, comprising a main unit and a rotating unit rotatably mounted on the main unit, wherein the rotating unit has a deflection member for projecting the pulsed beams by deflecting the beams perpendicularly to center axis of the rotating unit. The main unit comprises a plurality of light emitting sources disposed in a two-dimensional arrangement for emitting a plurality of pulsed beams, an optical system for projecting and receiving the pulsed beams, a rotation angle detecting unit, a plurality of photodetectors for receiving a reflection light from an object via the deflection member and being disposed respectively at positions conjugate to the light emitting sources, a distance measuring unit for measuring a distance based on a photodetection signal from the photodetector, and a control arithmetic unit for calculating projecting directions of the pulsed laser beams projected from the deflection member.

7 Claims, 9 Drawing Sheets

Va: PULSED LASER BEAM VERTICAL ANGLE
Vc: PRESET VERTICAL ANGLE (MAXIMUM VERTICAL ANGLE)
Ha: PULSED LASER BEAM HORIZONTAL ROTATION ANGLE
Hr: HORIZONTAL ROTATION ANGLE
$Va = Vc \cos(-2\pi Hr/360)$
$Ha = Hr - Vc \sin(-2\pi Hr/360)$

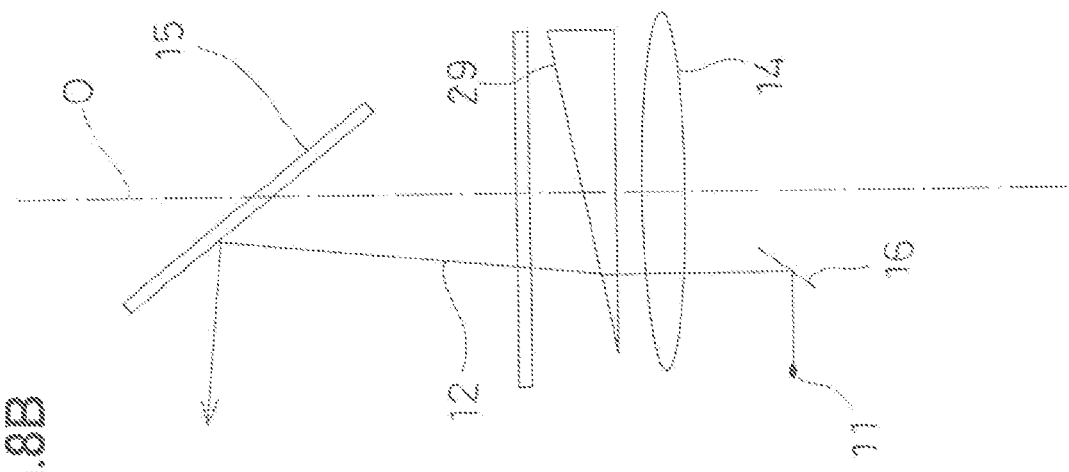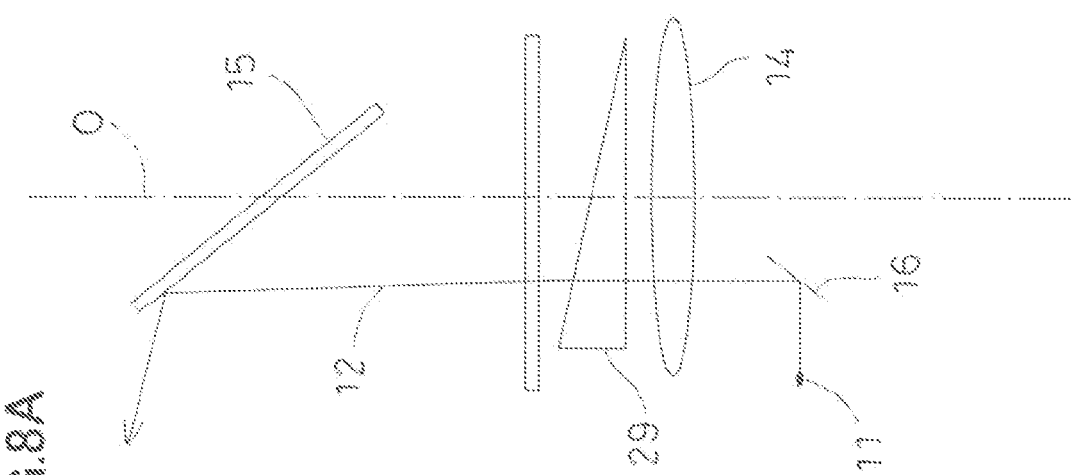

LASER SCANNER

BACKGROUND OF THE INVENTION

The present invention relates to a laser scanner for projecting pulsed laser beams to scan over total circumference, for measuring a multiple number of points at high speed and for acquiring three-dimensional position data at the multiple number of points.

In the past, a line scanner has been known as a laser scanner, which projects a single pulsed laser beam on a straight line for scanning and acquires distance measurement data for each pulse.

In recent years, there have been increasing demands to acquire data at higher speed over total circumferential direction of 360°. In case it is necessary to acquire the data over total circumferential direction, a plurality of line scanners are used to acquire the data. In this case, a plurality of costly line scanners are needed, and much time and more working operations have been needed for the adjustment of the acquired data.

As a device for acquiring data at a multiple number of points in total circumferential direction at higher speed, a laser scanner is known, which is used to acquire the data by projecting a plurality of beams (multi-beams) for scanning at the same time. Such type of laser scanner is disclosed, for instance, in the International Patent Publication 2008-008970. The International Patent Publication 2008-008970 discloses a laser scanner, which projects the plurality of laser beams in straight-line arrangement (e.g. in vertical arrangement) and scans in a direction perpendicularly crossing the arraying of laser beams (e.g. in horizontal direction). As a result, multi-point data in planar arraying are acquired.

In the laser scanner as described above, all components of the measuring system are disposed on a rotating unit, and the laser scanner has a structure where a rotating unit with high weight is rotated at high speed. As a result, the structure must be strong and solid and must have high accuracy. Accordingly, the laser scanner is costly.

SUMMARY OF THE INVENTION

To solve the above problems, it is an object of the invention to provide a laser scanner, which has simple and lightweight construction and can perform laser scanning by using multi-beam arrangement.

To attain the above object, the present invention provides a laser scanner for performing multi-point measurement by projecting a pulsed beam over total circumference for scanning, comprising a main unit and a rotating unit rotatably mounted on the main unit, wherein the rotating unit has a deflection member for projecting the pulsed beams by deflecting the beams perpendicularly to center axis of the rotating unit, the main unit comprises a plurality of light emitting sources disposed in two-dimensional positions and used for emitting a plurality of pulsed beams, an optical system for projecting and receiving the pulsed beams, a rotation angle detecting unit for detecting a horizontal rotation angle of the rotating unit, a plurality of photodetectors for receiving a reflection light from an object via the deflection member and being disposed respectively at positions conjugate to the light emitting sources, a distance measuring unit for measuring a distance based on a photodetection signal from the photodetector, and a control arithmetic unit for calculating projecting directions of the pulsed laser beams projected from the deflection member based on the disposed position of the light emitting sources and on the result of detection by the rotation angle detecting unit.

Also, the invention provides the laser scanner as described above, wherein the light emitting source and the photodetector are disposed on a circumference.

Further, the invention provides the laser scanner as described above, wherein the optical system has a condenser lens, and the condenser lens condenses lights so that optical axes of the pulsed beams from the light emitting sources are converged to a rotation center of the deflection member.

Also, the invention provides the laser scanner as described above, comprising a rotational deviation detecting unit for detecting a tilting of the rotating unit, wherein the control arithmetic unit compensates results of calculation of the projecting direction of the pulsed beams based on the results of detection by the rotational deviation detecting unit.

Further, the invention provides the laser scanner as described above, wherein the optical system has an optical path deflecting means for deflecting optical path of the pulsed beams.

Also, the invention provides the laser scanner as described above, wherein the rotational deviation detecting unit is rotated integrally with the deflection member, and comprises a rotary encoder unit having a reflecting mirror unit disposed on a circumferential edge, and a rotational deviation detector for projecting a tilted detection light to the reflecting mirror unit and for receiving a reflection tilt detecting light, and detects a change of center axis of the rotating unit based on angular change of the reflection tilt detecting light.

Further, the invention provides the laser scanner as described above, wherein the optical path deflecting means has another deflection member, the another deflection member is provided face-to-face to the light emitting sources, and deflects the pulsed beams in parallel with respect to the central axis.

The present invention provides a laser scanner for performing multi-point measurement by projecting a pulsed beam over total circumference for scanning, comprising a main unit and a rotating unit rotatably mounted on the main unit, wherein the rotating unit has a deflection member for projecting the pulsed beams by deflecting the beams perpendicularly to center axis of the rotating unit, the main unit comprises a plurality of light emitting sources disposed in two-dimensional positions and used for emitting a plurality of pulsed beams, an optical system for projecting and receiving the pulsed beams, a rotation angle detecting unit for detecting a horizontal rotation angle of the rotating unit, a plurality of photodetectors for receiving a reflection light from an object via the deflection member and being disposed respectively at positions conjugate to the light emitting sources, a distance measuring unit for measuring a distance based on a photodetection signal from the photodetector, and a control arithmetic unit for calculating projecting directions of the pulsed laser beams projected from the deflection member based on the disposed position of the light emitting sources and on the result of detection by the rotation angle detecting unit. As a result, it is possible to measure a multiple number of points by a plurality of pulsed laser beams and to acquire measurement data in planar shape of a multiple number of points at high speed. The portions to be measured by rotary scanning are limited to deflection members. Accordingly, it is possible to design the rotating unit in lightweight construction, and to reduce the cost.

According to the invention, a laser scanner can be provided, wherein the light emitting source and the photodetector are disposed on a circumference. As a result, it is possible to acquire measurement data in planar shape, and to attain uniformity of measurement density.

Also, the invention provides the laser scanner as described above, wherein the optical system has a condenser lens, and the condenser lens condenses lights so that optical axes of the pulsed beams from the light emitting sources are converged to a rotation center of the deflection member. As a result, it is possible to miniaturize the deflection member, to lighten the rotating unit. As a result, small-size designing of the laser scanner itself can be accomplished.

Further, the invention provides the laser scanner as described above, comprising a rotational deviation detecting unit for detecting a tilting of the rotating unit, wherein the control arithmetic unit compensates results of calculation of the projecting direction of the pulsed beams based on the results of detection by the rotational deviation detecting unit. As a result, even when there is a rotation error in the rotating unit, measurement data with high accuracy can be obtained.

Also, the invention provides the laser scanner as described above, wherein the optical system has an optical path deflecting means for deflecting optical path of the pulsed beams. As a result, it is possible to heighten the measurement density.

BRIEF DESCRIPTION OF THE DRAWINGS

FIG. 8(A) and FIG. 8(B) each represents a drawing to explain an operation of a rotating prism for deflecting an optical path of a pulsed laser beam in the second embodiment;

DETAILED DESCRIPTION OF THE PREFERRED EMBODIMENTS

Description will be given below on embodiments of the present invention by referring to the attached drawings.

Figure 1:
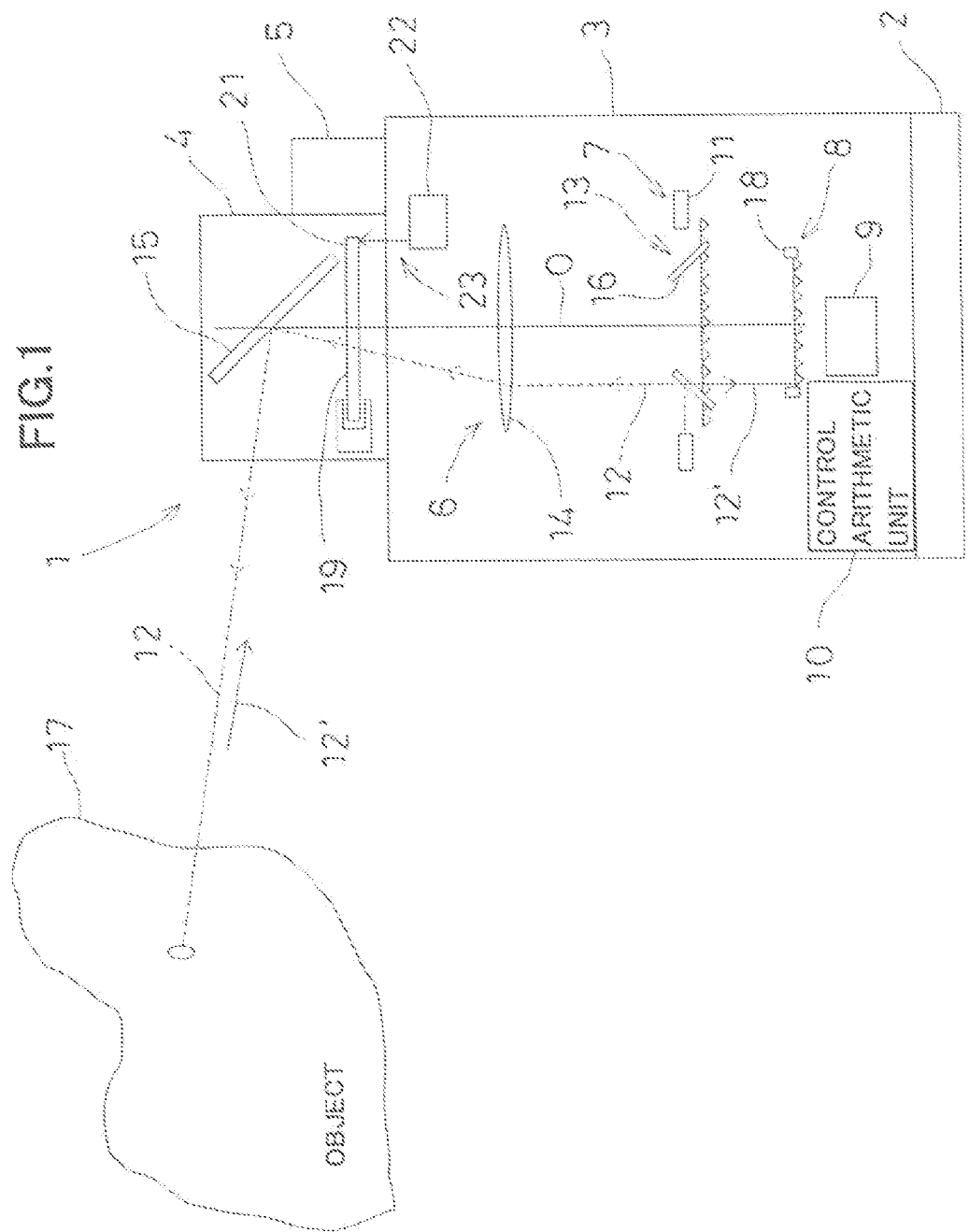
FIG. 1 is a schematical drawing to show a laser scanner according to a first embodiment of the present invention.

First, referring to FIG. 1, description will be given on general features of a laser scanner according to the present invention.

A laser scanner 1 comprises a leveling unit 2, a main unit 3, and a rotating unit 4.

The main unit 3 is installed via the leveling unit 2, and the leveling unit 2 has a function to adjust posture of the main unit 3 by taking a horizontal direction as reference.

The rotating unit 4 is rotatably mounted around a vertical axis (a centerline of rotation) with respect to the main unit 3, and the rotating unit 4 is designed to be rotated at a constant speed by a rotary driving unit 5.

The main unit 3 comprises a light-projecting and light-receiving optical system 6, a light emitting unit 7, a photodetector 8, a distance measuring unit 9, and a control arithmetic unit 10. An optical axis O of the light-projecting and light-receiving optical system 6 is extended in a vertical direction and coincides with a rotational centerline of the rotating unit 4.

Now, referring to FIG. 2 and FIG. 3, description will be given on the light-projecting and light-receiving optical system 6, the light emitting unit 7, and the photodetector 8.

The light emitting unit 7 is provided with a predetermined number of light emitting elements 11 disposed in a predetermined arrangement. For instance, 28 pieces of the light emitting elements 11 are arranged along circumference around the optical axis O at a predetermined number of equal angles, e.g. each disposed at an angle, which is obtained by equally dividing the circumference at 28 equal angles (12.86°).

It is so designed that each of the light emitting elements 11 emits a pulsed beam, e.g. a pulsed laser beam 12, as a distance measuring light in the horizontal direction along the optical axis O.

The light-projecting and light-receiving optical system 6 at least comprises a first deflection member 13 for deflecting the pulsed laser beams 12 emitted from the light emitting element 11 in a direction parallel to the optical axis O, a condenser lens 14, and a second deflection member 15, which is mounted on the rotating unit 4 and used for deflecting the pulsed laser beams 12 in the horizontal direction or in an approximately horizontal direction. The second deflection member 15 may be a reflecting mirror or a prism.

The first deflection member 13 comprises reflecting mirrors 16, each being disposed face-to-face to each of the light emitting elements 11. The reflecting mirrors 16 are arranged along a circumference around the optical axis O at the predetermined angular pitch (i.e. 12.86° in the present embodiment). The circumference where the reflecting mirrors 16 are arranged is designed to be smaller than the circumference where the light emitting elements 11 are disposed. Each of the reflecting mirrors 16 deflects the pulsed laser beams 12 so that the optical axis of each of the pulsed laser beams 12 runs in parallel to the optical axis O.

The condenser lens 14 is to condense optical axes of the pulsed laser beams 12 to a point where the optical axis O and the second deflection member 15 cross each other. The pulsed laser beam 12 is deflected in the horizontal direction by the second deflection member 15 and is projected to an object 17. A reflection light 12' reflected from the object 17 is deflected by the second deflection member 15 and enters the condenser lens 14. The condenser lens 14 makes the reflection light 12' converge to the photodetector 8. Because the condenser lens 14 is designed to condense the light axes of the pulsed laser beams 12 onto the second deflection member 15, it is possible to design the second deflection member 15 in smaller size.

The photodetector 8 and the light emitting unit 7 are disposed at positions conjugate to the light condenser lens 14.

The photodetector 8 is disposed at a position to be separated (to turn away) from the condenser lens 14 with respect to the light emitting unit 7. The photodetector 8 comprises a predetermined number of photodetecting elements 18 arranged on a circumference around the optical axis O. The photodetecting elements 18 are disposed at the predetermined angular pitch (12.86° in the present embodiment). Each of the photodetecting elements 18 is positioned face-to-face to each of the light emitting elements 11, and each of the photodetecting elements 18 is disposed at positions conjugate to each of the light emitting elements 11.

Based on a light-receiving (photodetecting) signal from the photodetector 8, the distance measuring unit 9 performs electro-optical distance measurement (distance measurement) to the object 17 for each of the pulses of the pulsed laser beams 12, and the results of the distance measurement are stored in the control arithmetic unit 10.

The rotating unit 4 is rotated at a predetermined constant speed by the rotary driving unit 5. The second deflection member 15 is rotated integrally with the rotating unit 4. The pulsed laser beams 12 are deflected in the horizontal direction and perform scanning over total circumference in the horizontal direction. The rotating unit 4 has a rotation angle detecting unit, e.g. a rotary encoder unit 19 to be rotated integrally with the second deflection member 15, and a projecting direction (horizontal angle) of the pulsed laser beam 12 is detected by the rotary encoder unit 19.

A rotational deviation detector 22 is arranged in the main unit 3, and a reflecting mirror unit 21 is provided on a circumferential edge of the rotary encoder unit 19, and the rotational deviation detector 22 is disposed in such manner as to face to the reflecting mirror unit 21. More concretely, the rotational deviation detector 22 projects a tilted detecting light toward the reflecting mirror unit 21, and a tilting of the rotary encoder unit 19 with respect to the main unit 3 can be detected according to a change of angle of the reflection light from the reflecting mirror unit 21. The reflecting mirror unit 21, the rotational deviation detector 22, etc. make up together a rotational deviation detecting unit 23. By detecting the tilting (change of tilt) of the rotary encoder unit 19 with respect to the main unit 3, the rotational deviation detecting unit 23 detects changes in direction of the rotation center axis of the rotating unit 4. The changes of projecting direction of the pulsed laser beam 12 are detected when the rotation center of the rotating unit 4 is deviated.

Figure 2:
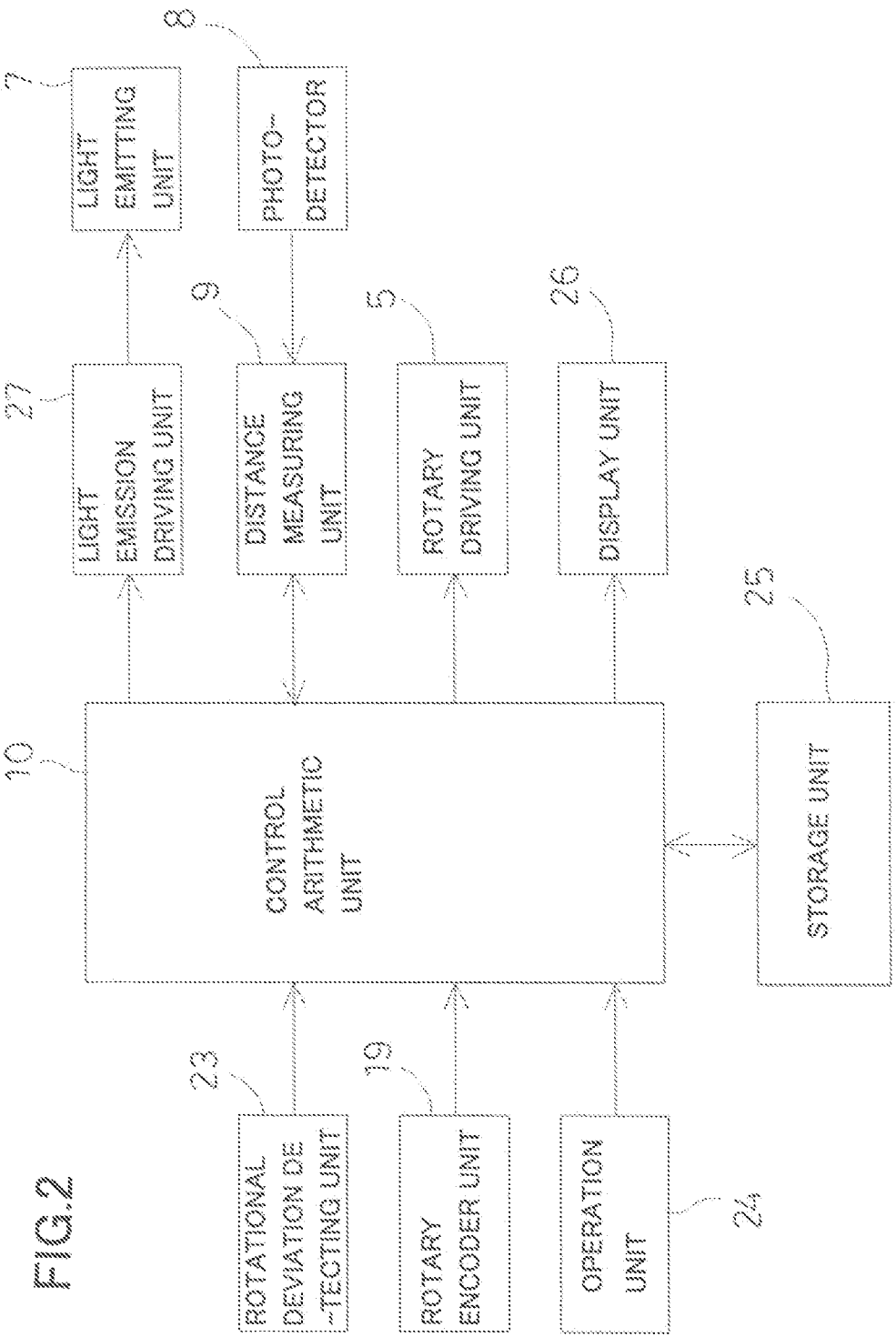
FIG. 2 is a control block diagram of the first embodiment.
Figure 3:
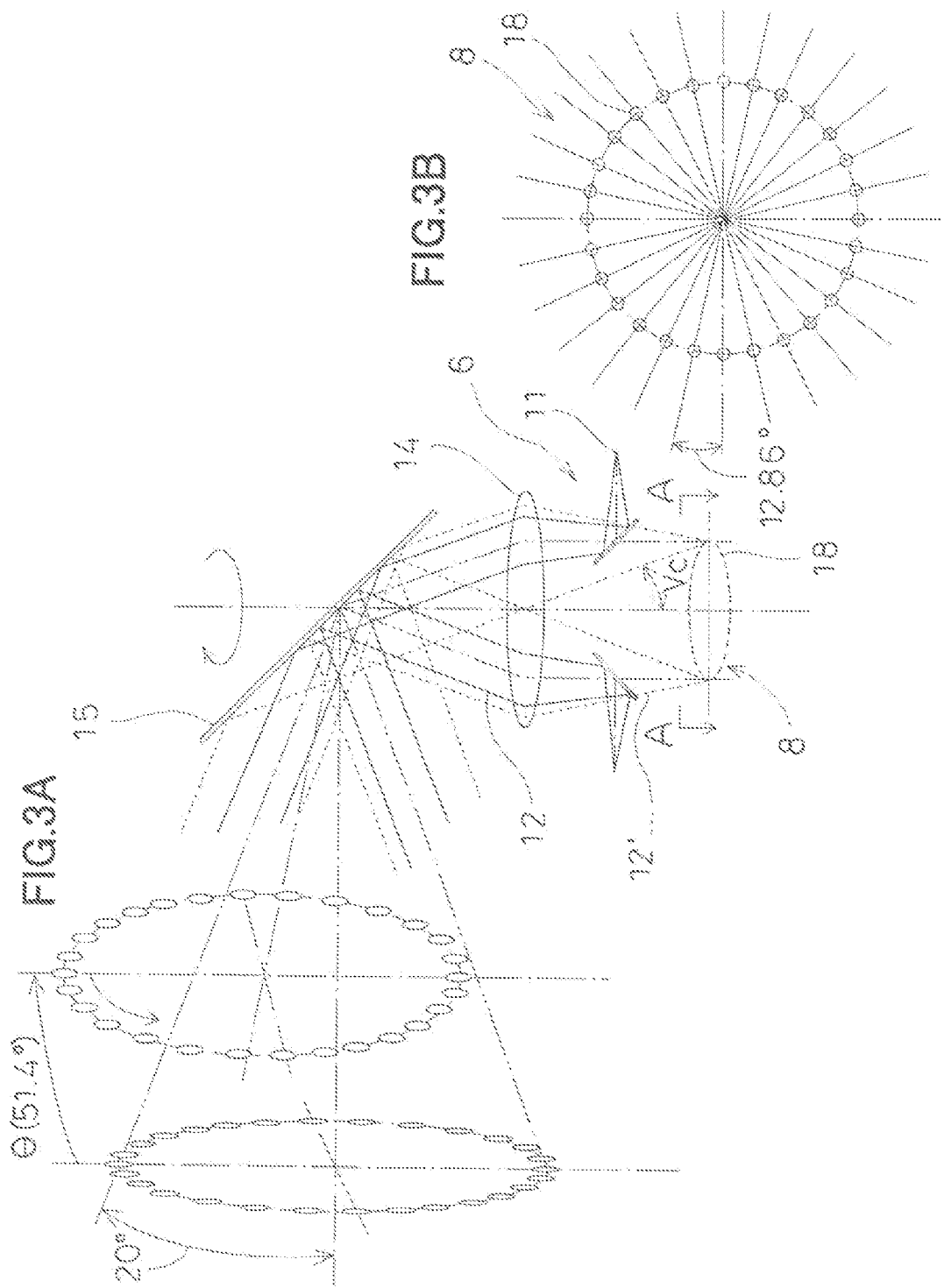
FIG. 3(A) is a drawing to explain an optical system.
FIG. 3(B) is an arrow diagram along the line A-A in FIG. 3(A)

FIG. 2 shows a control block diagram of the laser scanner 1.

In FIG. 2, reference number 24 denotes an operation unit, number 25 represents a storage unit, number 26 a display unit, and number 27 represents a light emission driving unit. Signals are inputted to the control arithmetic unit 10 from the rotary encoder unit 19, the rotational deviation detecting unit 23, and the operation unit 24. The control arithmetic unit 10 controls driving of the rotary driving unit 5, the distance measuring unit 9, the display unit 26, and the light emission driving unit 27.

An address number is given to each of the photodetecting elements 18 of the photodetector 8 so as to match each position as disposed. For instance, address numbers of 18-1 to 18-n are given respectively to the photodetecting elements 18. Also, with respect to the light emitting elements 11, address numbers are given to match each position as disposed, such as a light emitting element 11-1 to a light emitting element 11-n so that the photodetecting element 18 of an address number corresponds to the light emitting element 11 with the same address number.

As described above, the light emitting element 11 and the photodetecting element 18 are arranged at positions conjugate to each other. The light emitting element 11 and the photodetecting element 18 are in physically fixed positional relation to each other. Accordingly, regardless of rotation of the second deflection member 15, the pulsed laser beams 12 from the light emitting element 11 with an address number will be received by the photodetecting element 18 with the same address number.

A photodetection signal from the photodetecting element 18 is inputted to the distance measuring unit 9 and the control arithmetic unit 10. At the distance measuring unit 9, distance measurement is performed based on the photodetection signal, and results of distance measurement are inputted to the control arithmetic unit 10. An angle in the projecting direction of the pulsed laser beam 12 from the rotary encoder unit 19 is inputted to the control arithmetic unit 10, and results of tilt detection are inputted from the rotational deviation detecting unit 23.

The control arithmetic unit 10 makes the result of distance measurement from the distance measuring unit 9 correspond to the address number of each of the photodetecting elements 18. By associating this result of distance measurement with the result of the angle detection of the rotary encoder unit 19, these results are stored in the storage unit 25. The result of tilt detection from the rotational deviation detecting unit 23 is associated with the result of angle detection of the rotary encoder unit 19, and the results are stored in the storage unit 25.

The storage unit 25 has a data storage region and a program storage region. In the data storage region, data such as distance measurement data, angle data detected by the rotary encoder unit 19, and tilt data as detected by the rotational deviation detecting unit 23 are stored. In the program storage region, various types of programs are stored. These programs include: a sequence program for making the laser scanner 1 carry out measuring operation, a distance measuring program for carrying out a distance measurement and for calculating a distance, a projecting direction calculating program for calculating a projecting direction (horizontal angle and vertical angle) of the pulsed laser beam 12 as deflected by the second deflection member 15 and projected based on the result of angle detection by a rotary encoder unit 19, a compensation program to compensate the projecting direction of the pulsed laser beam 12 based on the result of angle detection by the rotary encoder unit 19, and other programs.

From the operation unit 24, signals for starting and stopping of the measurement or a setting of the measuring condition are inputted to the laser scanner 1.

On the display unit 26, condition of the laser scanner 1, or measuring condition, guiding instruction on measurement procedure, measurement result, etc. are displayed.

In the embodiment as described above, since the pulsed laser beam 12 is deflected in the horizontal direction by the tilted second deflection member 15 and the second deflection member 15 is rotated, with the rotation of the second deflection member 15, a vertical angle and a horizontal angle of the pulsed laser beam 12 are changed relatively with respect to the second deflection member 15.

Now, referring to FIG. 4 and FIG. 5, description will be given on condition of displacement of the vertical angle and the horizontal angle.

Figure 4:
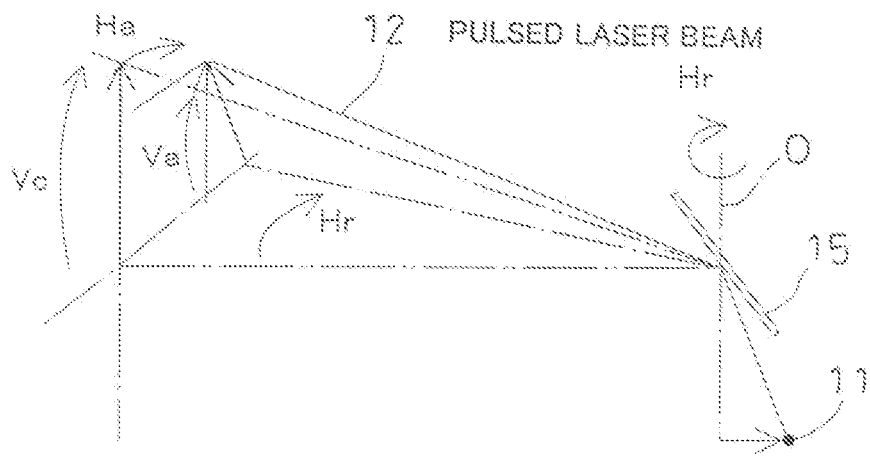
FIG. 4 is a diagram to explain a change of pulsed laser beam in projecting direction when a second deflection member is rotated.

In FIG. 4, reference symbol Va represents an actual vertical angle of the projected pulsed laser beam 12, reference symbol Vc represents a preset vertical angle (maximum vertical angle), symbol Ha represents an actual horizontal rotation angle of the projected pulsed laser beam 12, and symbol Hr represents a horizontal rotation angle of the second deflection member 15 (i.e. a rotation angle detected by the rotary encoder unit 19).

The light emitting element 11 is at a position to concur with tilting direction of the second deflection member 15. The position of the light emitting element 11 (as shown by tip of an arrow mark) is projected as a tip of an upright image, and the position of the light emitting element 11 has a maximum vertical angle Vc. When the second deflection member 15 is rotated by an angle of Hr, the arrow mark is tilted, and position of the light emitting element 11 will be:

$$Va=Vc\cdot\cos(-2\pi Hr/360); Ha=Hr-Vc\cdot\sin(-2\pi Hr/360).$$

Figure 5:
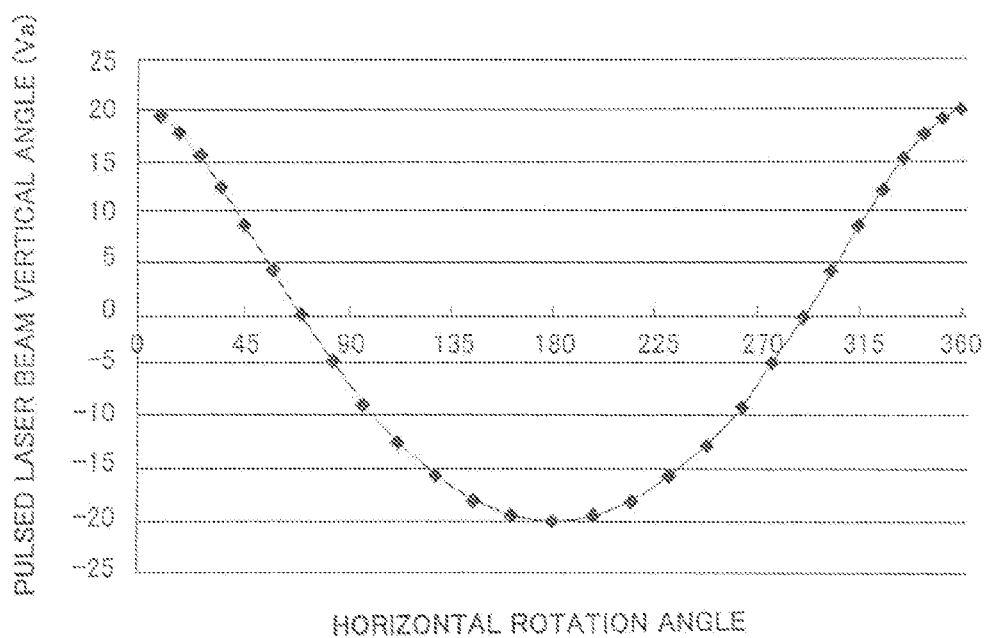
FIG. 5 is a diagram to show the change (locus) of the pulsed laser beam in projecting direction when the second deflection member is rotated.

Relationship between a horizontal rotation angle of the pulsed laser beam 12 as emitted from the light emitting element 11 and a vertical angle, that is, a locus of projecting position of the pulsed laser beam 12, is shown in FIG. 5. Therefore, based on the result of angle detection from the rotary encoder unit 19, a projecting direction of the pulsed laser beam 12 can be determined. FIG. 5 shows a case where it is supposed that the maximum preset vertical angle is 20°.

Figure 6:
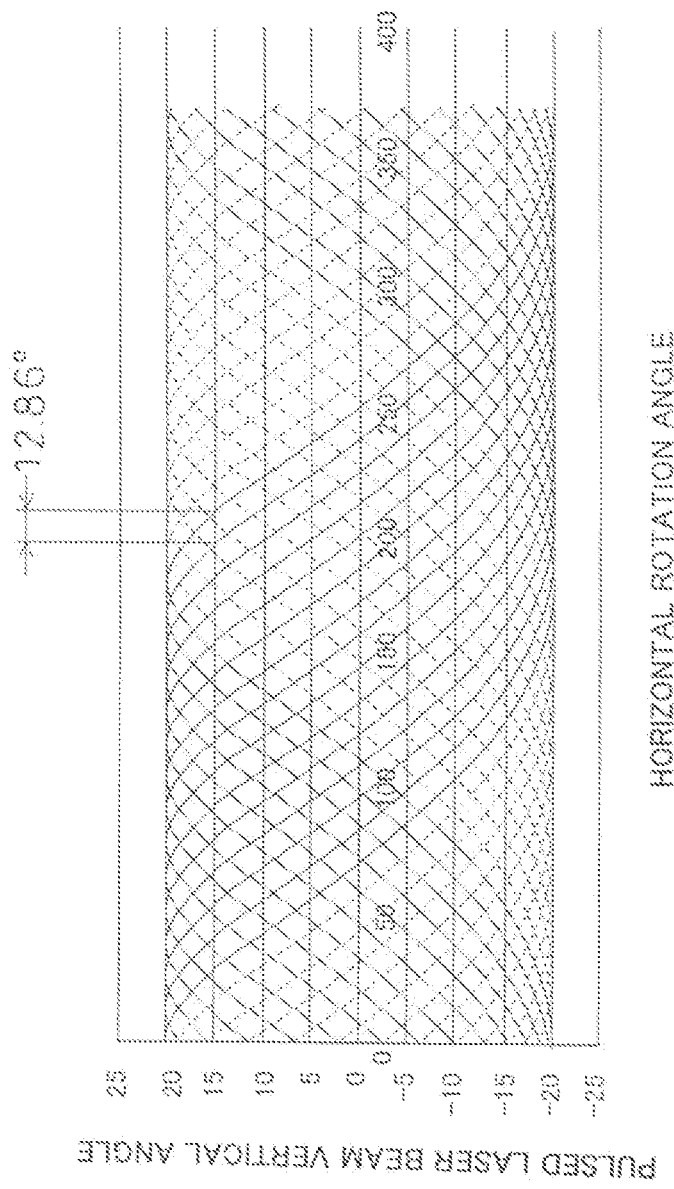
FIG. 6 is a diagram to show the changes (loci) in projecting direction of the pulsed laser beams from all light emitting elements when the second deflection member is rotated.

The light emitting element 11 is disposed with a predetermined angular pitch (12.86° in the present embodiment) on the same circumference, and the pulsed laser beam 12 from each of the light emitting elements 11 changes the projecting direction by the second deflection member 15, and a phase is deviated by 12.86° between the adjacent light emitting elements 11-$h$ and 11-($h$+1). FIG. 6 shows projection loci of the pulsed laser beams 12 from all of the light emitting elements 11. Accordingly, a plane is measured so that mesh-like loci are drawn on the plane as a whole. In general, a structure is made up by a combination of vertical and horizontal elements, therefore, the pulsed laser beams 12 certainly scans crossing the vertical line and the horizontal line of the structure. As a result, there is no omission in the measurement.

Figure 7:
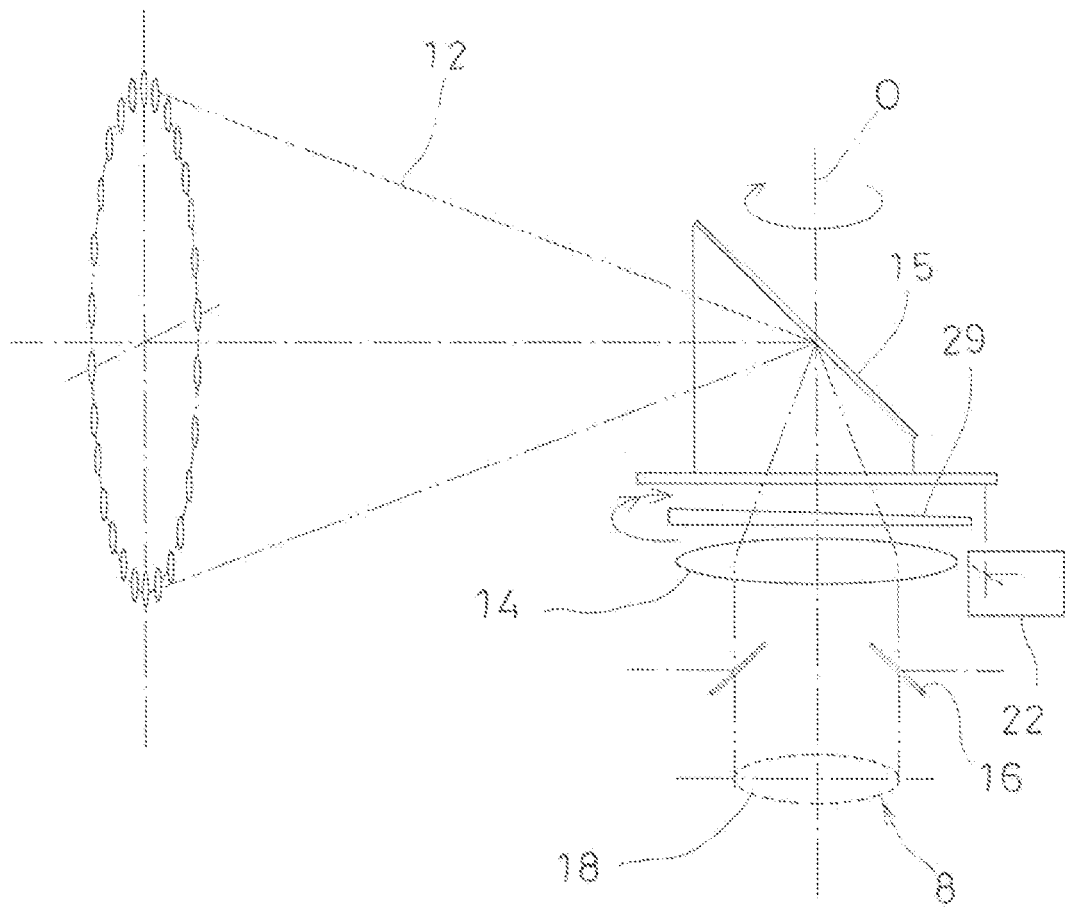
FIG. 7 is a schematical drawing to show an optical system of the laser scanner according to a second embodiment of the present invention.

FIG. 7 is a schematical drawing to show general features of an optical system according to a second embodiment.

In the second embodiment, a rotating prism 29 is provided as a means to deflect an optical path of a pulsed laser beam 12. The rotating prism 29 is disposed at a predetermined position. In the figure, the rotating prism 29 is disposed between a condenser lens 14 and a second deflection member 15. Although not shown in the figure, a rotating prism rotation angle detector for detecting a rotation angle of the rotating prism 29 is provided. By the rotating prism rotation angle detector, a rotation angle of the rotation prism 29 is detected, and a rotating position of the rotating prism 29 and a rotating position of the second deflection member 15 can be detected in such relation as to match each other.

As the rotating prism 29, a wedge prism is used, for instance. As shown in FIG. 8(A) and FIG. 8(B) in the wedge prism, a deviation amount of the optical path varies according to a change of transit position (passing position) caused by rotation of the prism of the pulsed laser beam 12. By the rotation of the rotating prism 29, the deviation amount of the optical path varies between maximum deflection amount and minimum deflection amount.

Figure 9:
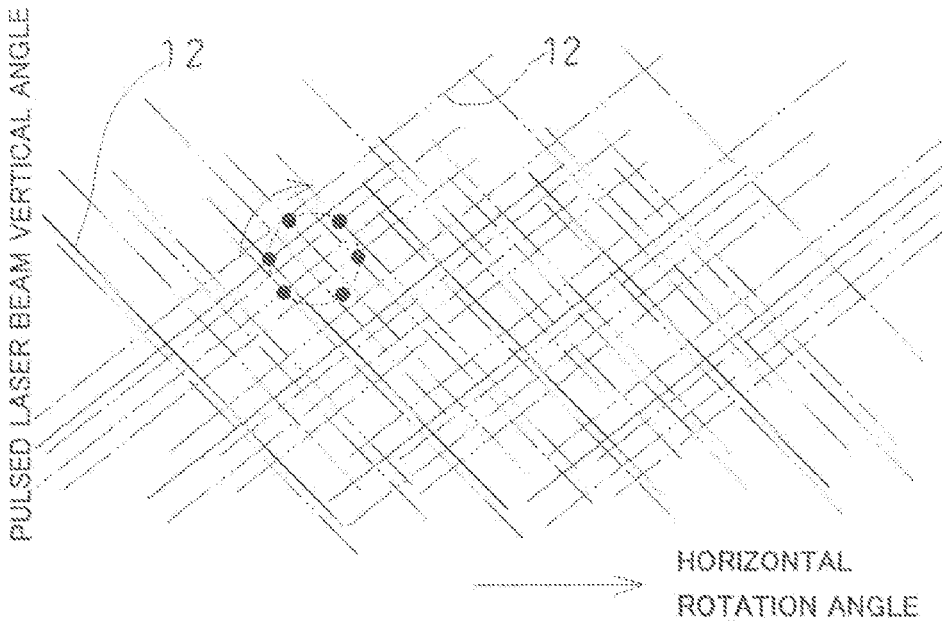
FIG. 9 is a schematical drawing to explain operation of optical path deflection of the pulsed laser beam by the rotating prism.

FIG. 9 shows locus of the projected pulsed laser beam 12 when the rotating prism 29 is used. In FIG. 9, a solid line shows a condition where there is no rotating prism 29, i.e. a condition where the optical path is not deflected. Each of two-dot chain lines shows a locus when the optical path is deflected by the rotating prism 29. Therefore, when angle of the optical path is deflected by the rotating prism 29, measurement can be performed by increasing more the density of the measuring points. For instance, when the rotating prism 29 is rotated at ½ of a rotating speed with respect to the rotation of the second deflection member 15, it is possible to perform the measurement with twice as high as measurement density. The wedge prism may be designed as a combination of two wedge prisms, which have directions of thickness different from each other.

By rotating the rotating unit 4 and by projecting a multiple number of the pulsed laser beams 12 for scanning, the measurement is performed. Thereby it is possible to acquire data at a multiple number of measuring points at the same time and to acquire measurement data in planar shape where no portion, for which measurement is not performed, exists.

Figure 10A:
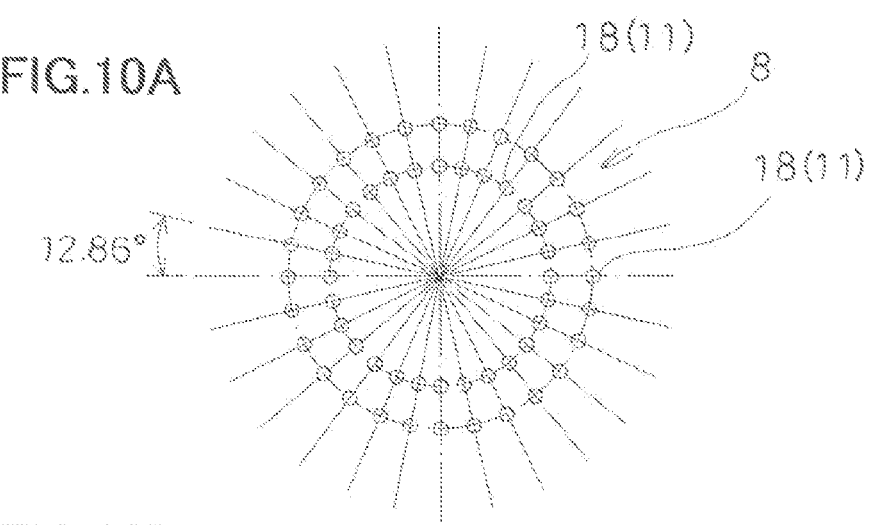
FIG. 10(A) and FIG. 10(B) each represents a drawing to show another example of arrangement of each of a light emitting element and a photodetecting (light-receiving) element.
Figure 10B:
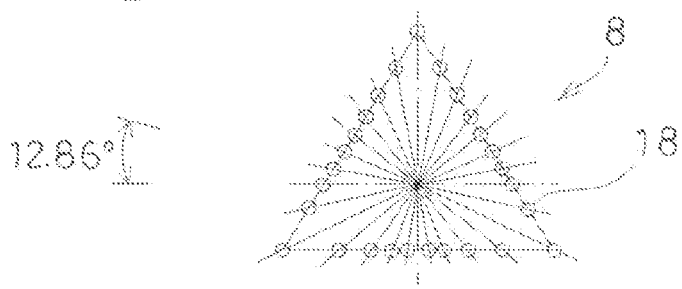

In the embodiment as described above, the light emitting elements 11 and the photodetecting elements 18 are set up in circular arrangement, while the setup of the light emitting elements 11 and photodetecting elements 18 is not limited to the circular arrangement. As shown in FIG. 10(A), an arrangement in multiple concentricity may be adopted. By designing on the multiple concentricity, measurement density is increased. Or, as shown in FIG. 10(B), triangular arrangement may be adopted. In short, the light emitting elements 11 and the photodetecting elements 18 can be set up in two-dimensional arrangement.

In the embodiment as described above, the light emitting elements 11 and the photodetecting elements 18 are disposed on the circumference. The light emitting elements 11 are defined as light emitting sources, and the photodetecting elements 18 themselves are defined as photodetectors, while it may be designed in such manner that the light emitting elements 11 and the photodetecting elements 18 are disposed at positions other than the positions of a light emitting unit 7 and a photodetector 8, that light emitting surfaces of optical fibers are disposed on the light emitting unit 7, that the pulsed laser beams 12 from the light emitting elements 11 are guided by the optical fiber, that the light emitting surfaces of the optical fibers are used as light emitting sources, and further, that end surfaces of the optical fibers are disposed at the positions of the photodetecting elements 18 as photodetecting surfaces, and that a reflection light 12' may be guided to the photodetecting elements 18 by the optical fiber.

The laser scanner according to the present invention may be fixedly provided and measurement may be made in planar arrangement with respect to an object, or, the laser scanner may be installed on a mobile object, and measurement may be performed on a multiple number of points arranged in planar setup on an object along the route while the mobile object is moving.

In the embodiments as given above, description has been given on a case where the rotation center axis of the rotating unit runs in vertical direction, while it may be so arranged that the rotation center axis runs in horizontal direction, and scanning may be made over total circumference with the rotation axis in horizontal direction as the center, and measurement may be made on a multiple number of points. Further, it may also be designed in such manner that the laser scanner may be installed in two directions, i.e. in vertical direction or in horizontal direction, and that multi-point measurement by scanning over total circumference in horizontal direction and multi-point measurement for scanning over total circumference in vertical direction may be carried out.

The invention claimed is:

1. A laser scanner for performing multi-point measurement by projecting a plurality of pulsed beams, used as distance measuring lights, over total circumference for scanning, wherein said laser scanner comprises a main unit and a rotating unit rotatably mounted around a center axis as the center with respect to said main unit, said rotating unit has a second deflection member for projecting said pulsed beams by deflecting the beams perpendicularly to center axis of said rotating unit, said main unit comprises a plurality of light emitting sources disposed on a plane perpendicular to said center axis, in a two-dimensional arrangement with said center axis as a center of said arrangement and used for emitting each of said plurality of pulsed beams, a plurality of first deflection members, each provided face-to-face with a respective light emitting source for deflecting pulsed laser beams from said light emitting sources in the direction of said second deflection member, an optical system for projecting and receiving said pulsed beams, a rotation angle detecting unit for detecting a horizontal rotation angle of said rotating unit, a plurality of photodetectors, equal to a number of said light emitting sources, being disposed at positions conjugate to said light emitting sources respectively, and for receiving a reflection light from an object via said second deflection member, a distance measuring unit for measuring a distance based on a photodetection signal from said photodetector, and a control arithmetic unit for calculating projecting directions of said pulsed laser beams projected from said deflection member based on the disposed position of said light emitting sources and on the result of detection by the rotation angle detecting unit.

2. A laser scanner according to claim 1, wherein said light emitting source and said photodetector are disposed on a circumference.

3. A laser scanner according to claim 1, wherein said optical system has a condenser lens, and said condenser lens condenses lights so that optical axes of said pulsed beams from said light emitting sources are converged to a rotation center of said second deflection member.

4. A laser scanner according to claim 1, comprising a rotational deviation detecting unit for detecting a tilting of said rotating unit, wherein said control arithmetic unit compensates results of calculation of the projecting direction of said pulsed beams based on the results of detection by the rotational deviation detecting unit.

5. A laser scanner according to claim 1, wherein said optical system has an optical path deflecting means for deflecting optical path of said pulsed beams.

6. A laser scanner according to claim 4, wherein said rotational deviation detecting unit is rotated integrally with said second deflection member, and comprises a rotary encoder unit having a reflecting mirror unit disposed on a circumferential edge, and a rotational deviation detector for projecting a tilted detection light to said reflecting mirror unit and for receiving a reflection tilt detecting light, and detects a change of center axis of said rotating unit based on angular change of said reflection tilt detecting light.

7. A laser scanner according to claim 5, wherein said optical path deflecting means has another deflection member, said another deflection member is provided face-to-face to said light emitting sources, and deflects said pulsed beams in parallel with respect to said central axis.

* * * * *